US008056113B2

(12) United States Patent
Balasubramanian et al.

(10) Patent No.: US 8,056,113 B2
(45) Date of Patent: Nov. 8, 2011

(54) MOBILE CONSUMER ELECTRONIC APPLICATIONS ON INTERNET VIDEO PLATFORM

(75) Inventors: Guru Prashanth Balasubramanian, San Diego, CA (US); Kalyana Kota, San Diego, CA (US); Utkarsh Pandya, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 528 days.

(21) Appl. No.: 12/322,657

(22) Filed: Feb. 5, 2009

(65) Prior Publication Data

US 2010/0194980 A1 Aug. 5, 2010

(51) Int. Cl.
*H04N 7/16* (2011.01)
(52) U.S. Cl. .............. 725/152; 463/40; 463/42
(58) Field of Classification Search ............... None
See application file for complete search history.

(56) References Cited

U.S. PATENT DOCUMENTS

| | | | |
|---|---|---|---|
| 5,609,525 A | 3/1997 | Ohno et al. | |
| 2002/0086734 A1* | 7/2002 | Krishnan et al. | 463/43 |
| 2006/0148571 A1 | 7/2006 | Hossack et al. | |
| 2007/0067808 A1* | 3/2007 | DaCosta | 725/62 |
| 2008/0134256 A1 | 6/2008 | DaCosta | |
| 2008/0168521 A1* | 7/2008 | Hsu et al. | 725/131 |
| 2008/0235736 A1* | 9/2008 | Dawson et al. | 725/50 |
| 2010/0311507 A1* | 12/2010 | Raichman et al. | 463/42 |

FOREIGN PATENT DOCUMENTS

| | | |
|---|---|---|
| EP | 0 431 723 A2 | 6/1991 |
| WO | WO 03/047710 A2 | 6/2003 |

OTHER PUBLICATIONS

"Sudoku Deluxe Interactive TV Game," GreatBuy USA, Aug. 3, 2006.

* cited by examiner

*Primary Examiner* — Kristine Kincaid
*Assistant Examiner* — Oschta Montoya
(74) *Attorney, Agent, or Firm* — Miller Patent Services; Jerry A. Miller (57) ABSTRACT

A request to transfer a consumer electronics (CE) application from a consumer electronics device to a TV device is received at the TV device. The CE application is received from the consumer electronics device. Application state information associated with the CE application is received from the consumer electronics device. The CE application and the application state information are stored to a memory. This abstract is not to be considered limiting, since other embodiments may deviate from the features described in this abstract.

1 Claim, 6 Drawing Sheets

MOBILE CONSUMER ELECTRONIC APPLICATIONS ON INTERNET VIDEO PLATFORM

BACKGROUND

Mobile consumer electronics (CE) applications and games are designed to operate upon consumer electronics devices and mobile devices, such as cell phones, PSPs and personal digital assistants (PDAs). Consumer electronics devices have relatively limited resources when compared to desktop computers and popular game boxes. For example, a consumer electronics device may have less memory, a lower processor speed, and lower quality graphics when compared with a desktop computer or a game box.

As such, these mobile CE applications and games are developed to use fewer system resources, such as memory and processor bandwidth, than their computer and game box-based counterparts. By being developed to use fewer system resources, the mobile CE applications and games function at an acceptable level within the relatively limited resources of a consumer electronics device.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "CE" is intended to mean a platform on which applications suitable for consumer electronic devices can run. Example consumer electronic devices include mobile devices, such as cellular telephones and personal digital assistants (PDAs), Sony PlayStation Portables® (PSPs), calculators, watches, etc. One currently popular example of CE is the Adobe® Flash® Lite™ platform from Adobe systems Inc. For purposes of the present description and the examples included herein, the term "consumer electronics device" excludes a television set for ease of illustration purposes. However, it is understood that the present subject matter may be utilized to function between two television sets without departure from the scope of the present subject matter.

The present subject matter provides automated transfer of consumer electronics (CE) applications, such as mobile CE game applications and productivity-based applications, developed for a TV platform between a consumer electronics device and a television (TV) device. Received applications may be resumed on the TV or consumer electronics device from a paused state based upon received execution state information, and may be paused and transferred back to the consumer electronics device or the TV, respectively, with modified state information. As such, users may freely move mobile CE applications between a mobile consumer electronics device and a TV for execution without starting the application over and may enjoy applications developed for a TV platform on a CE. Users may also competitively play mobile CE game applications from a given state by transferring an application and application state information and synchronizing restarts of the application between a consumer electronics device and a TV device. Developers may create, modify and test the applications/games on a PC and then deploy mobile CE applications on the TV using inputs from a TV remote control device. Wireless communication, such as Bluetooth, or wired communication, such as a universal serial bus (USB) or Sony Corporation's Bravia Internet Video Link (BIVL) may be used for transferring these mobile CE applications.

Figure 1:
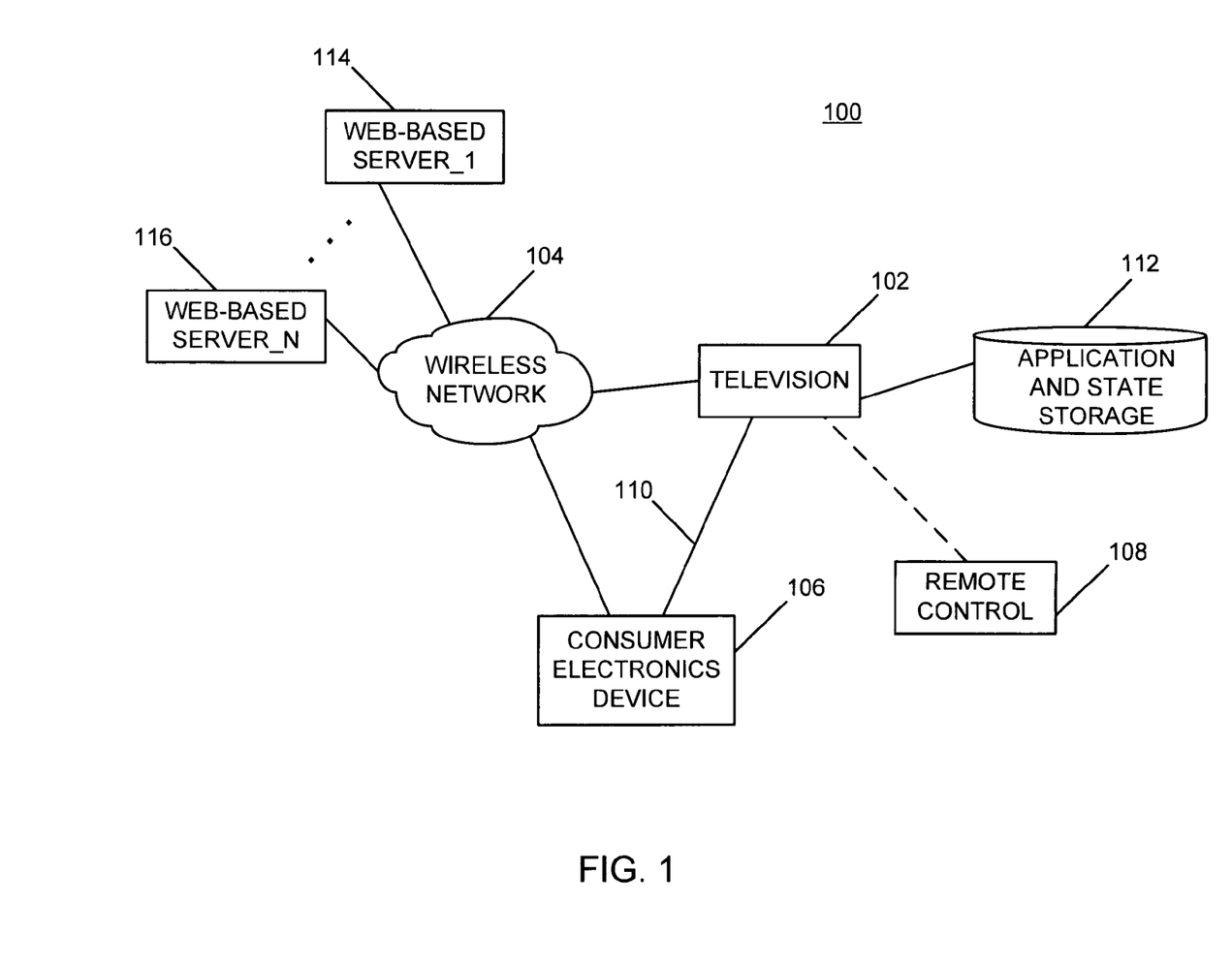
FIG. 1 is a block diagram of an example of an implementation of a system that provides automated transfer of consumer electronics (CE) applications developed for a television (TV) between consumer electronics devices and television (TV) devices consistent with certain embodiments of the present invention.

Turning now to FIG. 1, a block diagram of an example of an implementation of a system 100 is shown that provides automated transfer of consumer electronics (CE) applications, such as mobile CE game applications and productivity-based applications, developed for a TV between consumer electronics devices and television (TV) devices. A TV 102 interconnects via a wireless network 104 with a consumer electronics device 106. As will be described in more detail below, the TV 102 provides automated transfer of CE applications and enables deploying CE applications from the TV 102 using inputs from a TV remote control device 108. The TV remote control device 108 may provide inputs to the TV 102 via infra red signaling or any other suitable format or medium. Signaling from the TV remote control device 108 to the TV 102 is represented within FIG. 1 in a dashed-line format to distinguish it from the wireless communication facilitated by the wireless network 104. However, it is understood that wireless communication similar to that implemented by the wireless network 104 may be implemented between the TV 102 and the TV remote control device 108 without departure from the scope of the present subject matter.

The TV 102 and the consumer electronics device 106 may also be interconnected via a wired communication cable 110. The wired communication cable 110 may include a universal serial bus (USB) or cabling to enable a Bravia Internet Video Link (BIVL™), from Sony Electronics Inc., between the TV 102 and the consumer electronics device 106. The wired communication cable 110 is shown within FIG. 1 in a dashed-line configuration to illustrate that it is an alternative form of interconnection for the TV 102 and the consumer electronics device 106. Alternatively, the communication between television 102 and consumer electronics device 106 for app transfer may be implemented using, Bluetooth, or other wireless technologies.

A CE application and state storage information database 112 provides storage for CE applications and state information in association with the TV 102, and which may form a part of the TV 102 or may be separately contained. The CE application and state storage information may include executable CE application content and application state information. The application state information may include all data needed when an application is transferred from one machine to another to enable the application to proceed from a paused or stored point in operation of the application. CE applications may need to be paused and stored to the CE application and state storage information database 112 with application state information and may be resumed using the stored application state information. As will be described in more detail below, a CE application and application state information may be uploaded from the consumer electronics device 106 to the TV 102 or downloaded from the TV 102 to the consumer electronics device 106 to allow a user to freely move CE applications between the consumer electronics device 106 and the TV 102 for execution from a paused state without starting the application over and to allow the user to enjoy applications developed for the consumer electronics device 106 within the TV 102.

The network 104 also provides access to external devices, such as a web-based server_1 114 through a web-based server_N 116. As will be described in more detail below, the web-based server_1 114 may also store deployed CE applications for archival and distribution to users of devices, such as the TV 102 and the consumer electronics device 106. The web-based server_1 114 through the web-based server_N 116 may be provisioned and configured as Internet video link (IVL) servers, known in one form commercially via a trademark of Sony Electronics Inc. as the BIVL™ provisioning server. As such, CE applications may be deployed either directly to a user of the consumer electronics device 106 or may be deployed for broader distribution via any of the web-based server_1 114 through the web-based server_N 116.

The web-based server_1 114 through the web-based server_N 116 may be any network-based server accessible via the wireless network 104. Examples of web-based servers of CE applications that are presently within the marketplace are Amazon.com®, Yahoo!®, AOL®, mobile telephone system operators, and PDA manufacturers. Many other network accessible web-based servers exist and many others are contemplated by the present subject matter. Accordingly, distribution of CE applications associated with all such network-accessible web-based servers is considered within the scope of the present subject matter.

The wireless network 104 may be any wireless network, such as a cellular or other type of wireless network. Additionally, the wireless network 104 may include wired or other network domains, such as the Internet or other network, capable of allowing communication between devices. Other networks and communication interfaces exist and all are considered within the scope of the present subject matter. As described above, the web-based server_1 114 through the web-based server_N 116 may be any device or Internet server or service that stores CE applications and that is accessible via the wireless network 104 that the TV 102 and the consumer electronics device 106 may access for mobile application storage and retrieval purposes.

Upon creation of a CE application, the CE application and application state information may be uploaded to any of the web-based server_1 114 through the web-based server_N 116, or downloaded from the TV 102 to the consumer electronics device 106 to allow a user to use the CE application as described above and in more detail below. Additionally, a CE application may be executed on either the TV 102 or the consumer electronics device 106, paused, and stored in a paused state of execution on any of the TV 102, the consumer electronics device 106, or any of the web-based server_1 114 through the web-based server_N 116. As such, a user may store a CE application in a given state of execution and distribute it to other CE application users in a given state of execution. For example, the aspect of distributing CE applications in varying states of execution may be attractive for users of CE games that are trying to learn and aid other users in advanced game features. Example consumer electronic devices, such as the consumer electronics device 106, include a personal computer (PC), a personal digital assistant (PDA), a mobile phone, or other mobile device (none shown) without departure from the scope of the present subject matter.

Accordingly, the present subject matter allows users of a TV, such as the TV 102, to develop, execute, and share, CE applications with other users via the wireless network 104 or Bluetooth, USB, or other communications connectivity. Many possibilities exist for propagation of CE applications using the TV 102 and all are considered within the scope of the present subject matter.

Figure 2:
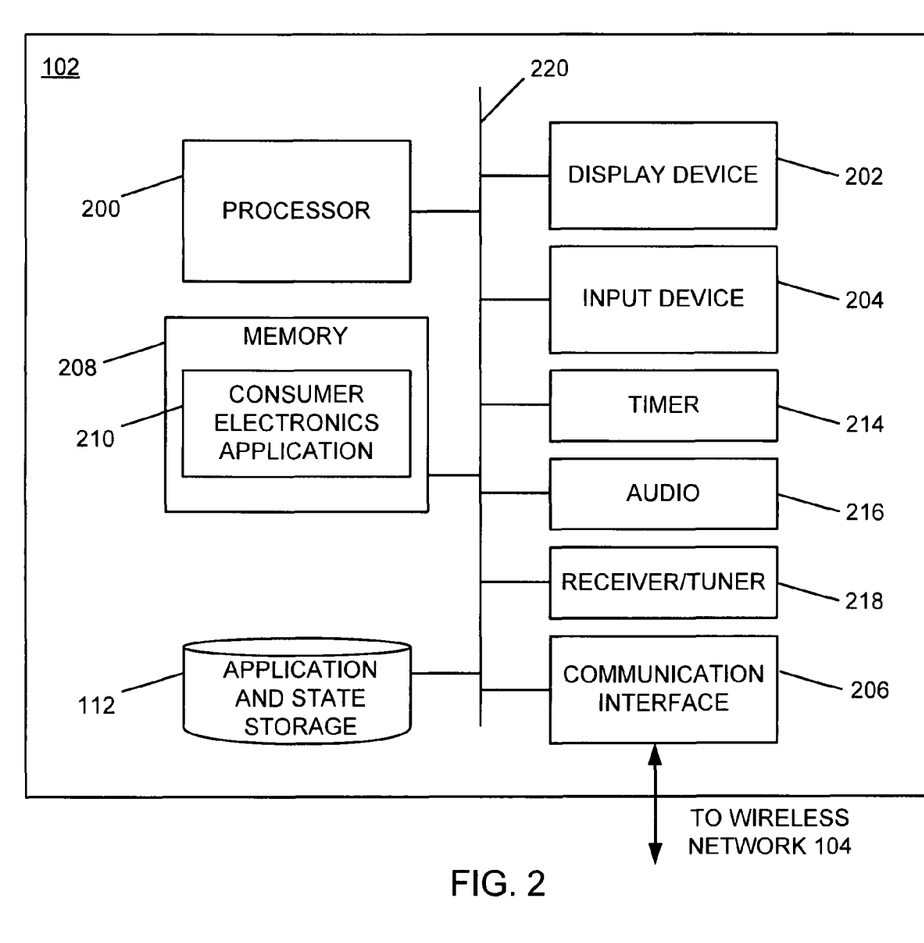
FIG. 2 is a block diagram of an example of an implementation of the TV that allows users to develop, test, and transfer mobile CE applications between consumer electronics devices and storage and distribution servers consistent with certain embodiments of the present invention.

FIG. 2 is a block diagram of an example of an implementation of the TV 102 that allows users to develop, test, and transfer CE applications, such as CE game applications and productivity-based applications, between consumer electronics devices and storage and distribution servers. In certain implementations, the TV 102 is enabled to receive programming via any of a variety of media including, but not limited to, broadcast television signals, Cable television signals, and Internet television programming via Internet Protocol (IPTV). A processor 200 provides computer instruction execution, computation, and other capabilities within the TV 102. A display device 202 provides visual and/or other information to a user of the TV 102. The display device 202 includes a display screen and display interface circuitry (not shown for ease of illustration purposes) and presents visual representations of content associated with CE applications to allow the user to see responses to interaction with the CE application. The display device 202 may include any type of display device, such as a cathode ray tube (CRT), liquid crystal display (LCD), light emitting diode (LED), projection or other display element or panel: An input device 204 provides input capabilities for the user. The input device 204 may include a mouse, pen, trackball, or other input device. The input device 204 may further include circuitry for receiving input from the TV remote control device 108, such as infrared receiver circuitry. One or more input devices, such as the input device 204, may be used.

A communication interface 206 encapsulates and provides communication capabilities for interaction with the web-based server_1 114 through the web-based server_N 116 on the wireless network 104. The communication interface 206 also encapsulates and provides communication capabilities for interaction with the consumer electronics device 106. It should be noted that the communication interface 206 is illustrated as a component-level module for ease of illustration and description purposes. It is also understood that the communication interface 206 includes any hardware, programmed processor(s), and memory used to carry out the functions of the communication interface 206 as described above and in more detail below. For example, the communication interface 206 may include additional controller circuitry in the form of application specific integrated circuits (ASICs), processors, and/or discrete integrated circuits and components for performing electrical control activities associated with the communication interface 206. Additionally, the communication interface 206 also includes interrupt-level, stack-level, and application-level modules as appropriate. Furthermore, the communication interface 206 includes any memory components used for storage, execution, and data processing by these modules for performing processing activities associated with the communication interface 206. The communication interface 206 may also form a portion of other circuitry described below without departure from the scope of the present subject matter.

A memory 208 includes a CE application 210. The CE application 210 is executable in association with the TV 102 to allow user interaction with the CE application 210. The CE application 210 may be a stand-alone application executable on the TV 102. Alternatively, the CE application 210 may be designed to execute within an operating platform (not shown) or as part of a software developers application.

The CE application 210 include instructions executable by the processor 200 for performing these and other functions. The CE application 210 may form a portion of an interrupt service routine (ISR), a portion of an operating system, or a portion of a separate application without departure from the scope of the present subject matter. Any firmware associated with a programmed processor that forms a portion of the CE application 210 may be stored within, executed from, and use data storage space within the memory 208 without departure from the scope of the present subject matter.

It is understood that the memory 208 may include any combination of volatile and non-volatile memory suitable for the intended purpose (e.g., Random Access Memory, Read Only. Memory, Flash Memory, etc.), distributed or localized as appropriate, and may include other memory segments not illustrated within the present example for ease of illustration purposes. For example, the memory 208 may include a code storage area, a code execution area (e.g., an operating system area and other areas for code execution), and a data area suitable for storage and execution of the CE application 210 and any firmware associated with a programmed processor that forms a portion of the communication interface 206, as appropriate. It is also be understood that, though the CE application and state storage information database 112 is illustrated as a separate component, the CE application and state information may also be stored within the memory 208 as described above without departure from the scope of the present subject matter.

A timer 214 allows timing of activities, such as resume and competitive activities, associated with a CE application. The timer 214 operates, among other functionality, as a timing module for coordinating CE application activities between the TV 102 and external devices, such as the consumer electronics device 106. Details associated with processing for timing and/or coordination of resumed execution for CE applications are described in association with FIG. 4 below.

An audio module 216 includes audio control and driver circuitry for providing audio output from the TV 102. A receiver/tuner module 218 includes receiver and tuner circuitry for tuning to and receiving information from designated television channels. A detailed description of the audio module 216 and the receiver/tuner module 218 is not provided herein for ease of illustration purposes.

The processor 200, the display device 202, the input device 204, the communication interface 206, the memory 208, the CE application and state storage information database 112, the audio module 216, and the receiver/tuner module 218 are interconnected via one or more interconnections shown as interconnection 220 for ease of illustration. The interconnection 220 may include a system bus, a network, or any other interconnection capable of providing the respective components with suitable interconnection for the respective purpose.

Figure 3:
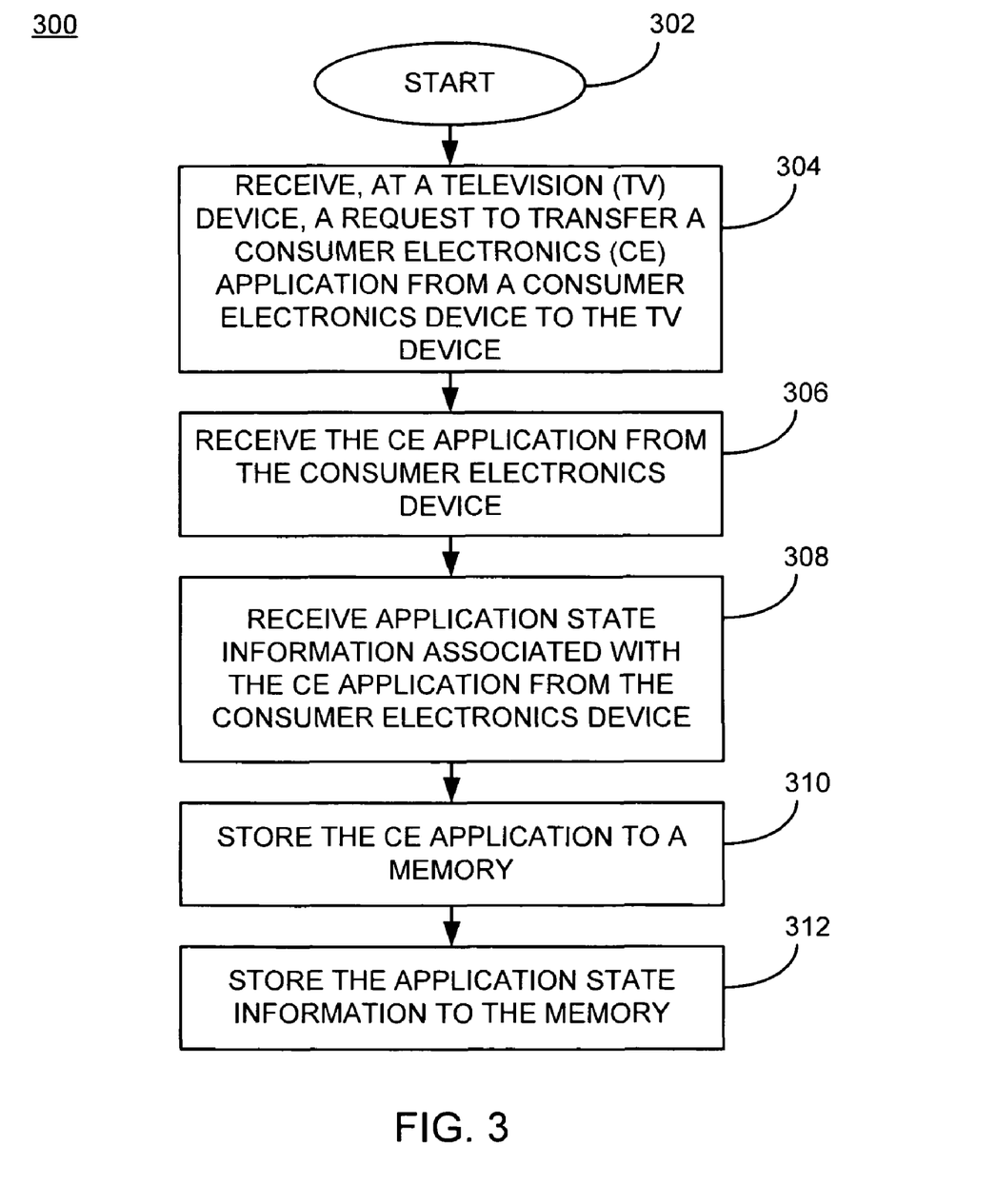
FIG. 3 is a flow chart of an example of an implementation of a process that provides automated transfer of mobile CE applications and application state information between a consumer electronics device and a television (TV) device consistent with certain embodiments of the present invention.

FIG. 3 is a flow chart of an example of an implementation of a process 300 that provides automated transfer of CE applications, such as CE game applications and productivity-based applications, and application state information between a consumer electronics device and a television (TV) device. The process 300 along with the other processes described below may be executed by the TV 102 for automated processing as described above and in more detail below. The process 300 starts at 302. At block 304, the process 300 receives, at a TV device, a request to transfer a CE application from a consumer electronics device to the TV device. At block 306, the process 300 receives the CE application from the consumer electronics device. At block 308, the process 300 receives application state information associated with the CE application from the consumer electronics device. At block 310, the process 300 stores the CE application to a memory. At block 312, the process 300 stores the application state information to the memory.

Figure 4:
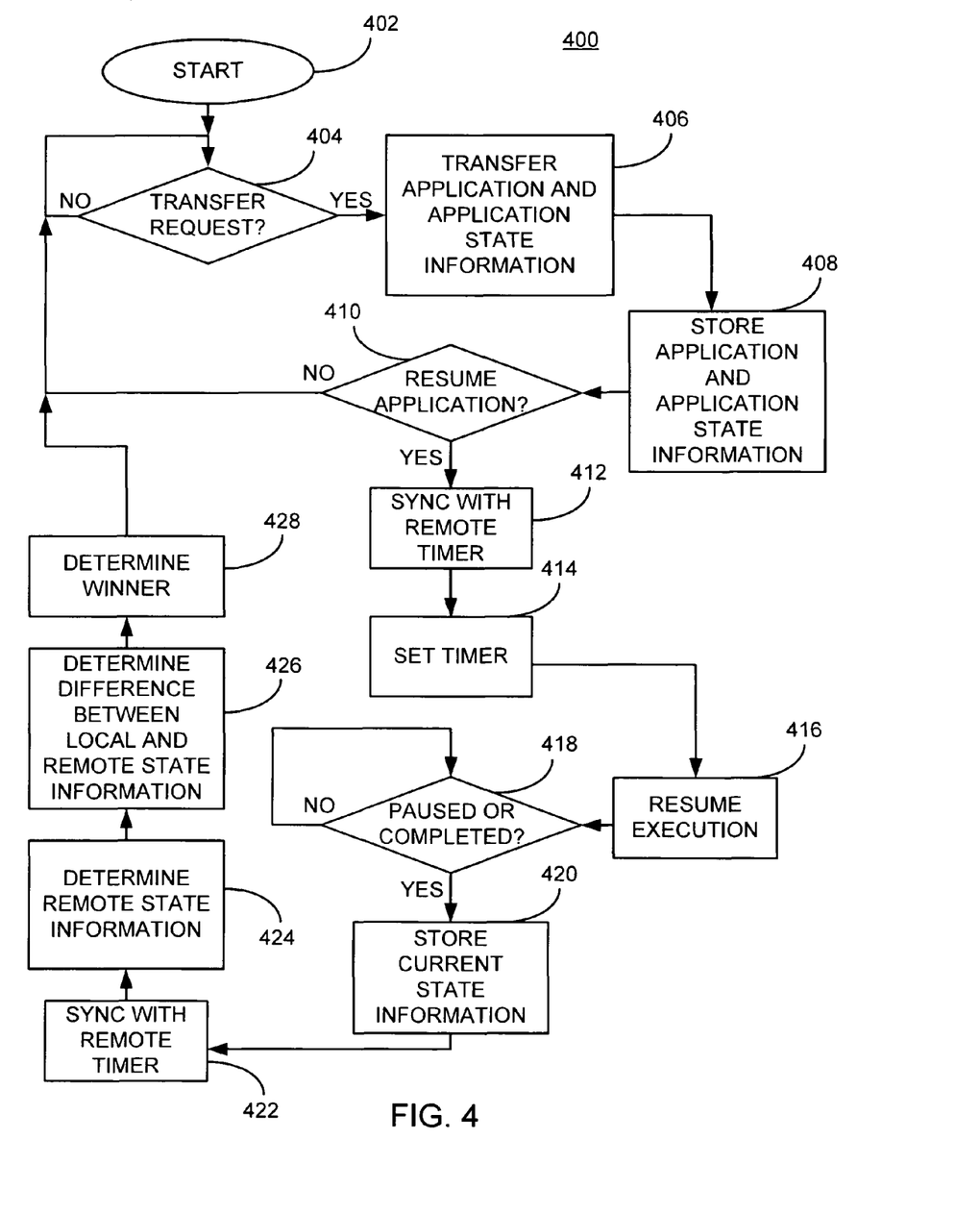
FIG. 4 is a flow chart of an example of an implementation of a process that provides automated transfer of mobile CE applications and application state information between a consumer electronics device and a TV device and that allows a user of the TV device to compete with a user of the consumer electronics device from a given state represented by the transferred application state information consistent with certain embodiments of the present invention.

FIG. 4 is a flow chart of an example of an implementation of a process 400 that provides automated transfer of CE applications, such as a CE game application, and application state information between a consumer electronics device and a TV device and that allows a user of the TV device to compete with a user of the consumer electronics device from a given state represented by the transferred application state information. It should be noted that the process 400 may be executed on either the TV 102 or the consumer electronics device 106 for purposes of CE application transfer and that this portion of the process 400 may be considered a subprocess. Furthermore, portions of the process 400 that allow users of both devices to compete during execution may be executed on both devices. As such, the process 400 is illustrated as a single process for ease of illustration purposes.

The process 400 starts at 402 and waits for a transfer request to be received at decision point 404. For purposes of the present example, a user of either the TV 102 or the consumer electronics device 106 may initiate transfer of a CE application. Additionally, initiation of a transfer may be performed via the TV 102 by use of the TV remote control device 108. As will be described in more detail in association with FIG. 5 and FIG. 6 below, options for transfer may be presented within a Cross Media Bar (XMB) associated with a user interface application on the TV 102. Alternatively, a user of the consumer electronics device 106 may initiate a request to transfer a CE application to or from the TV 102. In such a situation, a user of the TV 102 may be prompted to authorize the transfer between the two devices. As with the previous example, an XMB graphical user interface system may be used to prompt the user of the TV 102 for initiation of the transfer and the user may acknowledge the initiation of the transfer by use of the TV remote control device 108.

Continuing with the description of decision point 404, when a transfer request has been initiated and acknowledged, if appropriate for the given implementation, the CE application and state information is transferred at block 406. The transfer may be either an upload or a download to the given device that is executing the process 400. As described above, the state information may be used to resume execution of the CE application from a previously paused state of execution. The state information may be used to resume execution of the application and in certain realizations may be used to resume execution of a CE game application for competitive purposes between users of the TV 102 and the consumer electronics device 106.

Furthermore, transfer of the CE application may be by cellular wireless communication, Bluetooth wireless communication, universal serial bus (USB) communication, and Bravia Internet Video Link (BIVL), among other transfer possibilities. Many other possibilities exist for transferring mobile transfer applications and all are considered within the scope of the present subject matter.

At block 408, the process 400 stores the transferred CE application and application state information. It should be noted that order is not implied within the process 400 or other processes described herein. As such, for example, for a download operation from the TV 102 to the consumer electronics device 106, the CE application and application state information may be saved before it is transferred to the consumer electronics device 106 without departure from the scope of the present subject matter.

At decision point 410, the process 400 makes a determination as to whether a request to resume execution of the transferred CE application has been received. When a determination is made that a request to resume execution of the transferred CE application has not been received, the process 400 returns to decision point 404 to await another transfer request.

When a determination is made that a request to resume execution of the transferred CE application has been received, the process 400 synchronizes with a remote timer at block 412 for competitive execution of the CE application on the TV 102 and the consumer electronics device 106. For example, when the process 400 is executing on the TV 102, the process 400 will synchronize with a timer on the consumer electronics device 106, and vice versa, to allow competitive resumption of a CE game application.

It should be understood that, while the present example describes competitive resumption of the CE game application and processing to coordinate competitive resumption, this is not a requirement and a CE application may be resumed after transfer to or from either device without synchronizing with the receiving or sending device, respectively. As such, the present example describes additional processing that would not be required for resuming a CE application without coordination with another device.

Upon synchronization with the remote timer at block 412, the process 400 sets a timer, such as the timer 214, at block 414 and resumes execution of the CE application at block 416. At decision point 418, the process 400 makes a determination as to whether the execution of the CE application has been paused or completed. A determination of completion may be determined based upon known completion state information or from user input on either device. In the case of execution of the process 400 on the TV 102, the determination of completion of execution pause may be based upon user input using the TV remote control device 108. When a determination is made that the execution of the CE application has been paused or completed, the process 400 stores current application state information at block 420.

At block 422, the process 400 synchronizes with the remote timer. At block 424, the process 400 determines remote application state information. At block 426, the process 400 determines a difference between the local stored current application state information and the remote application state information. At block 428, the process 400 determines a winner for the synchronized competition and returns to decision point 404 to await another transfer request.

As such, the process 400 allows users of the consumer electronics device 106 and the TV 102 to shares CE applications, and also allows competitive gaming in real time between the two devices (e.g., the TV 102 and the consumer electronics device 106). Many other possibilities exist for transfer and coordination of mobile transfer applications between the consumer electronics device 106 and the TV 102 and all are considered within the scope of the present subject matter.

Figure 5:
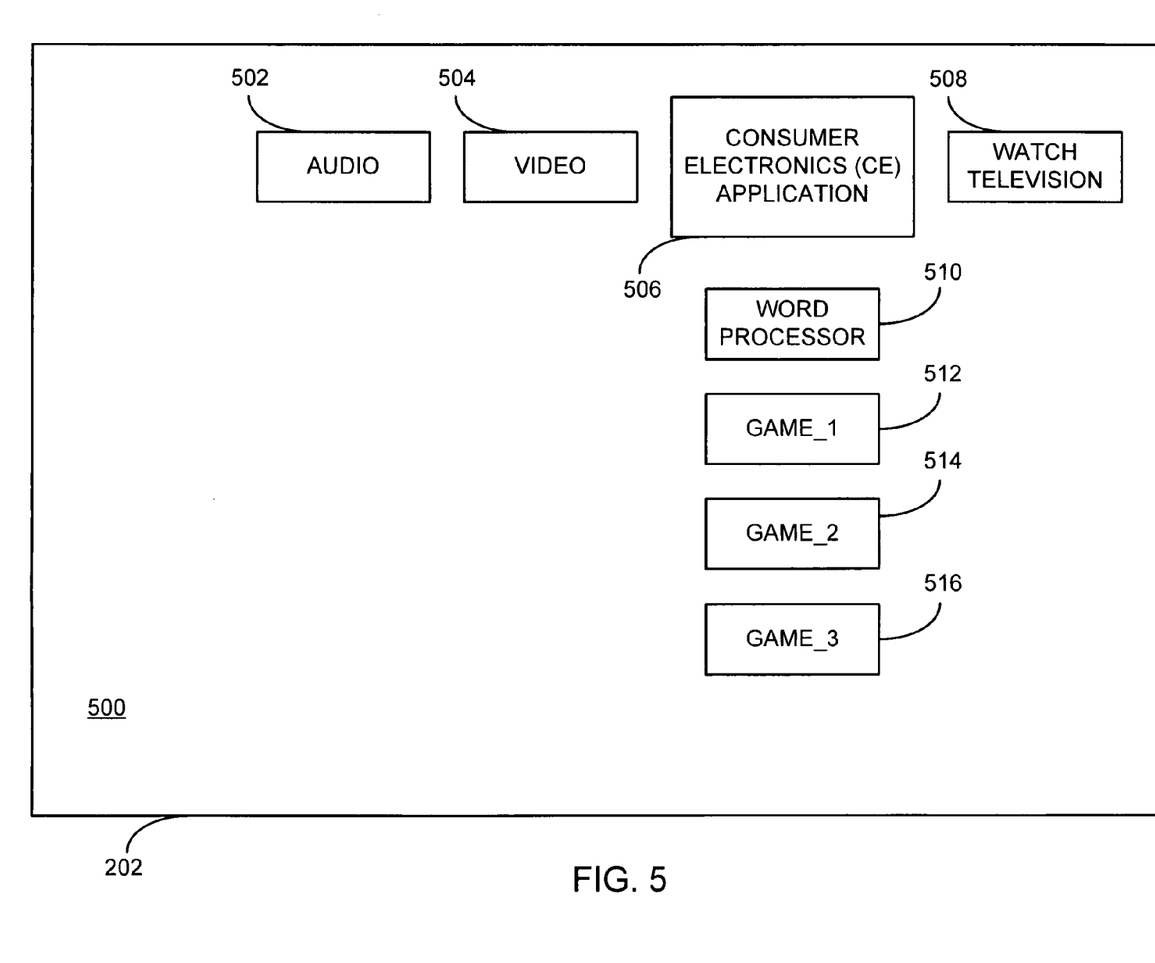
FIG. 5 is a diagram of a first example of an implementation of a Cross Media Bar (XMB) graphical user interface system on a display device of a TV device for allowing a user to select options for performing operations on a mobile CE application consistent with certain embodiments of the present invention.

FIG. 5 is a diagram of a first example of an implementation of a XMB graphical user interface system 500 on the display device 202 of the TV 102 for allowing a user to select options for performing operations on a CE application. While the blocks illustrated within the XMB graphical user interface system 500 are shown in menu format, it will be understood that suitable icons can be used in their place in an XMB GUI environment as is commonly used for other menu selections within the XMB GUI environment. It is further understood that the XMB GUI environment is a hierarchical environment, and that the hierarchical nature of the XMB GUI is illustrated within the XMB graphical user interface system 500. However, it should be noted that any other style of media bar may be used without departure from the scope of the present subject matter.

As can be seen from the XMB GUI 500, an option 502 allows a user of the TV 102 to modify audio settings for the TV 102. An option 504 allows the user to modify video settings for the TV 102. An option 506 allows the user to perform operations on CE applications, as discussed above and in more detail below. An option 508 allows the user to watch television. As can be seen from FIG. 5, the option 506 for performing operations on CE applications is shown larger than other options to illustrate that the option 506 is a "focused" option within the XMB GUI 500.

With the option 506 focused, other options are presented to the user of the TV 102. As can be seen from FIG. 5, an option 510 to execute a word processing CE application, an option 512 to execute a first CE game application (e.g., GAME_1), an option 514 to execute a second CE game application (e.g., GAME_2), and an option 516 to execute a third CE game application (e.g., GAME_3) are shown.

Figure 6:
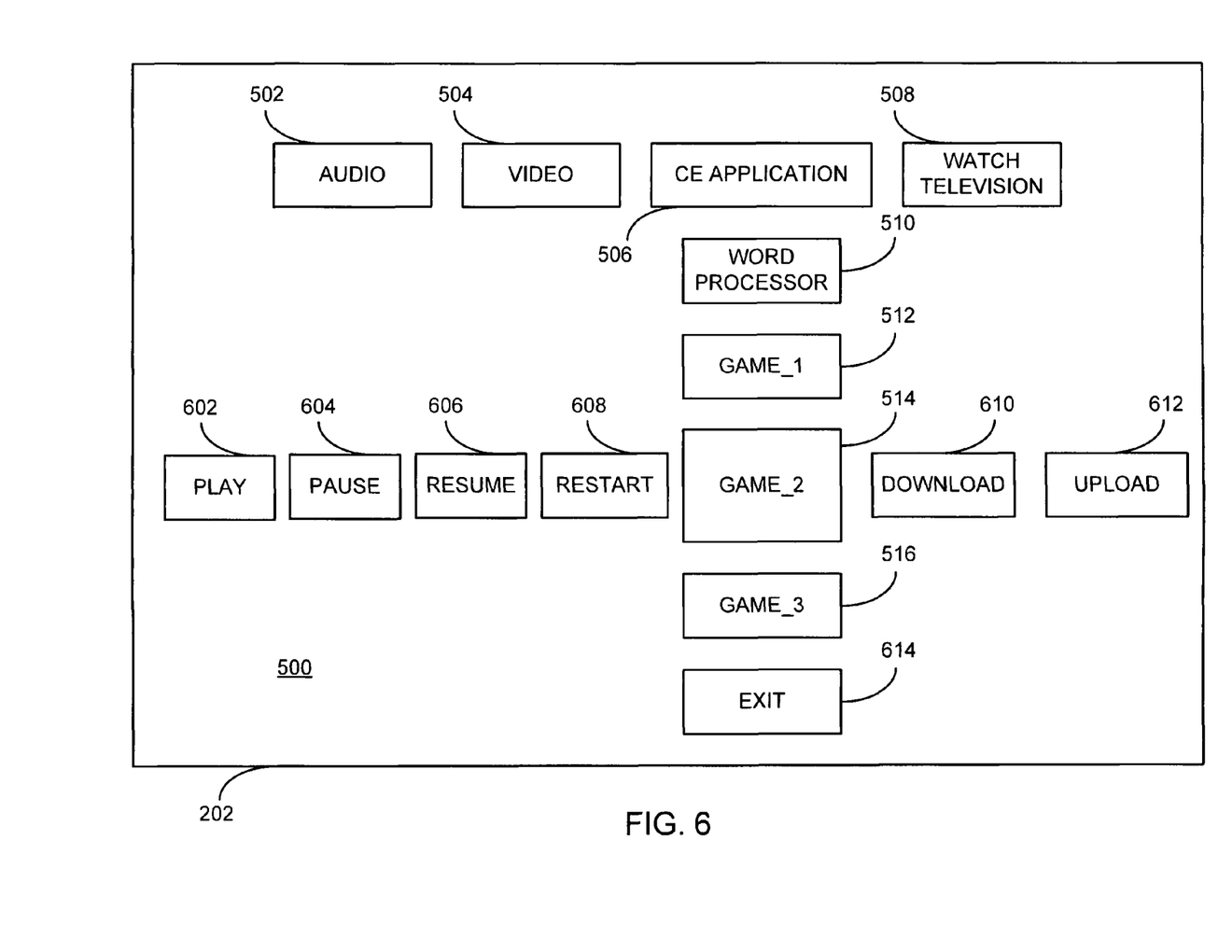
FIG. 6 is a diagram of a second example of an implementation of the XMB graphical user interface system of a TV device of FIG. 5 for allowing a user to select options for playing a mobile CE application and is shown in a state after the user has navigated to the option for playing a mobile CE application consistent with certain embodiments of the present invention.

FIG. 6 is a diagram of a second example of an implementation of the XMB graphical user interface system 500 of FIG. 5 for allowing the user to select options for executing the GAME_2 CE application and is shown in a state after the user has navigated to the option 514. As can be seen from the XMB GUI 500 of FIG. 6, the option 514 to allow a user of the TV 102 to execute the GAME_2 CE application is shown larger than other options to illustrate that the option 514 is a "focused" option within the XMB GUI 500.

An option 602 is shown to allow the user to play the selected CE application from a beginning state. An option 604 is shown to allow the user to pause execution of the selected CE application. An option 606 is shown to allow the user to resume execution of the selected CE applications from a known state represented by received and/or stored application state information. An option 608 is shown to allow the user to restart execution of the selected CE application from a beginning state. An option 610 is shown to allow the user to download the selected CE application to a consumer electronics device, such as the consumer electronics device 106. An option 612 is shown to allow the user to upload the selected CE application from an external device, such as the consumer electronics device 106 or any of the web-based server_1 114 through the web-based server_N 116. As such, a user may readily navigate between playing, pausing, resuming, and restarting, and uploaded and/or downloading selected CE applications. An option 614 allows the user to readily exit from the CE application portion of the XMB graphical user interface system 500 without navigating back up the hierarchy to the option 506 and then navigating left or right within the XMB graphical user interface system 500.

Based upon the foregoing description, the present subject matter provides automated transfer of CE applications between a consumer electronics device and a television (TV) device. The present subject matter also provides development and testing capabilities for the CE application on the TV device. Further, users of a consumer electronics device and a TV device may competitively play a CE game or other application from a given state based upon pause state information and compare execution results.

Thus, in accord with certain implementations, a method of utilizing a television (TV) device for consumer electronics (CE) applications involves receiving, at the television (TV) device, a request to transfer a CE application from a consumer electronics device to the TV device; receiving the CE application from the consumer electronics device; receiving application state information associated with the CE application from the consumer electronics device; storing the CE application to a memory; and storing the application state information to the memory.

In certain implementations, the method of utilizing the television (TV) device for CE applications further involves receiving the CE application and the application state information from the consumer electronics device via a process selected from a group consisting of cellular wireless communication, Bluetooth wireless communication, universal serial bus (USB), and Bravia Internet Video Link (BIVL). In certain implementations, the method further involves, where the application state information associated with the CE application further involves pause state information, resuming execution of the CE application on the TV device from a state represented by the pause state information. In certain implementations, the method further involves executing the CE application on the TV device and allowing a user of the TV device to interact with the CE application via a TV remote control device. In certain implementations, executing the CE application further involves resuming execution of the CE application based upon the received application state information. In certain implementations, the method further involves receiving a request to pause execution of the CE application and storing a current state of execution of the CE application as modified application state information associated with the CE application in the memory in response to receiving the request. In certain implementations, the method further involves receiving a request to transfer the CE application to the consumer electronics device via the TV remote control device. In certain implementations, receiving the request to transfer the CE application to the consumer electronics device further involves receiving the request based upon a user option presented within a Cross Media Bar (XMB) associated with a graphical user interface (GUI) of a TV user interface application executed on the TV device. In certain implementations, the method further involves, in response to receiving the request to transfer the CE application to the consumer electronics device via the TV remote control device: reading the CE application from the memory; reading the modified application state information from the memory; and sending the CE application and the modified application state information to the consumer electronics device. In certain implementations, sending the CE application and the modified application state information to the consumer electronics device further involves sending the CE application and the modified application state information to the consumer electronics device via a process selected from a group consisting of cellular wireless communication, Bluetooth wireless communication, universal serial bus (USB) communication, and Bravia Internet Video Link (BIVL). In certain implementations, the method further involves enabling a CE application developer using a TV remote control device to modify the CE application and the application state information using a graphical user interface (GUI) of the TV device and storing the modified CE application and the modified application state information to the memory. In certain implementations, enabling the CE application developer using the TV remote control device to modify the CE application and the application state information further involves providing a Cross Media Bar (XMB) associated with the GUI of the TV device, where the XMB involves options for modification and test of the CE application and the application state information. In certain implementations, the method further involves enabling the CE application developer using the TV remote control device to test the modified CE application with the modified application state information within the GUI of the TV device. In certain implementations, the method further involves sending the modified CE application and the modified state information to the consumer electronics device in response to receiving a request to transfer the CE application to the consumer electronics device. In certain implementations, the method further involves sending the modified CE application and the modified state information to a network server in response to receiving a request to transfer the CE application to the network server. In certain implementations, the method further involves enabling a CE application developer using a TV remote control device to integrate a third-party CE application with the CE application. In certain implementations, the method further involves providing an option to a user via a graphical user interface (GUI) of the TV device to acknowledge the request to transfer the CE application from the consumer electronics device to the TV device. In certain implementations, the method further involves receiving an acknowledgement from the user via an input associated with a TV remote control device to transfer the CE application from the consumer electronics device to the TV device; and receiving the CE application and the application state information from the consumer electronics device is performed in response to receiving the acknowledgement from the user. In certain implementations, providing the option to the user via the GUI of the TV device further involves providing the option within a Cross Media Bar (XMB) associated with a user interface application. In certain implementations, the CE application further includes a CE game application. In certain implementations, the method further involves synchronizing resumed execution of the CE game application on each of the consumer electronics device and the TV device based upon the received application state information. In certain implementations, the method further involves determining which of a user of the consumer electronics device and a user of the TV device was first to complete execution of the CE game application.

A television (TV) device consistent with certain implementations has a memory adapted to store consumer electronics (CE) applications; and a processor programmed to: receive a request to transfer a CE application from a consumer electronics device to the TV device; receive the CE application from the consumer electronics device; receive application state information associated with the CE application from the consumer electronics device; store the CE application to the memory; and store the application state information to the memory.

In certain implementations, the TV device consistent with certain implementations further includes a communication interface module adapted to implement a communication process selected from a group consisting of cellular wireless communication, Bluetooth wireless communication, universal serial bus (USB) communication, and Bravia Internet Video Link (BIVL), and the processor is further programmed to receive the CE application and the application state information from the consumer electronics device via the communication interface module. In certain implementations, the application state information associated with the CE application further includes pause state information and the processor is further programmed to resume execution of the CE application from a state represented by the pause state information. In certain implementations, the TV device consistent with certain implementations further includes an input device adapted to receive user inputs from a TV remote control device and the processor is further programmed to execute the CE application and to allow the user to interact with the CE application via the user inputs from the TV remote control device. In certain implementations, in being programmed to execute the CE application, the processor is further programmed to resume execution of the CE application based upon the received application state information. In certain implementations, the processor is further programmed to receive a request to pause execution of the CE application via the TV remote control device and to store a current state of execution of the CE application as modified application state information associated with the CE application in the memory in response to receiving the request. In certain implementations, the processor is further programmed to receive a request to transfer the CE application to the consumer electronics device via the TV remote control device. In certain implementations, the TV device consistent with certain implementations further includes a display device adapted to display a Cross Media Bar (XMB) associated with a graphical user interface (GUI) of a TV user interface application and the processor, in being programmed to receive the request to transfer the CE application to the consumer electronics device, is further programmed to receive the request based upon a selection of a user option presented within the Cross Media Bar (XMB) by the user. In certain implementations, in being programmed to receive the request to transfer the CE application to the consumer electronics device via the TV remote control device, the processor is further programmed to: read the CE application from the memory; read the modified application state information from the memory; and send the CE application and the modified application state information to the consumer electronics device. In certain implementations, the TV device consistent with certain implementations further includes a communication interface module adapted to implement a communication process selected from a group consisting of cellular wireless communication, Bluetooth wireless communication, universal serial bus (USB) communication, and Bravia Internet Video Link (BIVL), and the processor, in being programmed to send the CE application and the modified application state information to the consumer electronics device, is further programmed to send the CE application and the modified application state information to the consumer electronics device via the communication interface module. In certain implementations, the TV device consistent with certain implementations further includes an input device adapted to receive inputs from a TV remote control device and a display device adapted to display a graphical user interface (GUI) associated with a TV user interface application, and the processor is further programmed to enable a CE application developer using the TV remote control device to modify the CE application and the application state information using a graphical user interface (GUI) presented on the display device and to store the modified CE application and the modified application state information to the memory. In certain implementations, the display device is further adapted to implement a Cross Media Bar (XMB) associated with the GUI and the XMB includes options for modification and test of the CE application and the application state information. In certain implementations, the processor is further programmed to enable the CE application developer using the TV remote control device to test the modified CE application with the modified application state information within the GUI. In certain implementations, the TV device consistent with certain implementations further includes a communication interface module adapted to implement a communication process selected from a group consisting of cellular wireless communication, Bluetooth wireless communication, universal serial bus (USB), and Bravia Internet Video Link (BIVL), the processor is further programmed to send the modified CE application and the modified state information to the consumer electronics device via the communication interface in response to receiving a request to transfer the CE application to the consumer electronics device. In certain implementations, the TV device consistent with certain implementations further includes a communication interface module adapted to implement a communication process selected from a group consisting of cellular wireless communication, Bluetooth wireless communication, universal serial bus (USB), and Bravia Internet Video Link (BIVL), and the processor is further programmed to send the modified CE application and the modified state information to a network server via the communication interface in response to receiving a request to transfer the CE application to the network server. In certain implementations, the TV device consistent with certain implementations further includes an input device adapted to receive inputs from a TV remote control device, and the processor is further programmed to enable a CE application developer using the TV remote control device to integrate a third-party CE application with the CE application. In certain implementations, the TV device consistent with certain implementations further includes a display device adapted to display a graphical user interface (GUI) associated with a TV user interface application, and the processor is further programmed to provide an option to a user via the GUI to acknowledge the request to transfer the CE application from the consumer electronics device to the TV device. In certain implementations, the processor is further programmed to: receive an acknowledgement from the user via an input associated with a TV remote control device to transfer the CE application from the consumer electronics device to the TV device; and receive the CE application and the application state information from the consumer electronics device in response to receiving the acknowledgement from the user. In certain implementations, the processor is further programmed to provide the option to the user via the GUI and to provide the option within a Cross Media Bar (XMB) associated with the GUI on the display. In certain implementations, the CE application further includes a CE game application. In certain implementations, the TV device consistent with certain implementations further includes a timing module, and the processor is further programmed to synchronize resumed execution of the CE game application on each of the consumer electronics device and the TV device based upon the received application state information via the timing module. In certain implementations, the processor is further programmed to determine which of a user of the consumer electronics device and a user of the TV device was first to complete execution of the CE game application based upon information associated with the timing module.

A television (TV) device consistent with certain implementations has a memory adapted to store consumer electronics (CE) game applications; a communication interface module adapted to implement a communication process selected from a group consisting of cellular wireless communication, Bluetooth wireless communication, universal serial bus (USB) communication, and Bravia Internet Video Link (BIVL); an input device adapted to receive user inputs from a TV remote control device; a display device adapted to display a Cross Media Bar (XMB) associated with a graphical user interface (GUI) of a TV user interface application; and a processor programmed to: receive a request to transfer a CE game application from a consumer electronics device to the TV device via the communication interface; receive the CE game application from the consumer electronics device via the communication interface; receive pause state information associated with the CE game application from the consumer electronics device via the communication interface; store the CE game application to the memory; store the pause state information to the memory; display a user option within the XMB associated with the GUI to resume execution of the CE game application; receive a user input request via the input device from the TV remote control device to resume execution of the CE game application; and resume execution of the CE game application from a state represented by the pause state information in response to the user input request.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:
1. A television (TV) device, comprising:
a memory adapted to store consumer electronics (CE) game applications;
a communication interface module adapted to implement a communication process selected from a group consisting of cellular wireless communication, Bluetooth wireless communication, universal serial bus (USB) communication, and Internet Video Link;
an input device adapted to receive user inputs from a TV remote control device;

a display device adapted to display a Cross Media Bar (XMB) associated with a graphical user interface (GUI) of a TV user interface application; and a processor programmed to:
- receive a request to transfer a CE game application from a consumer electronics device to the TV device via the communication interface;
- receive the CE game application from the consumer electronics device via the communication interface;
- receive pause state information associated with the CE game application from the consumer electronics device via the communication interface;
- store the CE game application to the memory;
- store the pause state information to the memory;
- display a user option within the XMB associated with the GUI to resume execution of the CE game application;
- receive a user input request via the input device from the TV remote control device to resume execution of the CE game application; and
- resume execution of the CE game application from a state represented by the pause state information in response to the user input request.

* * * * *